Patented Dec. 19, 1950

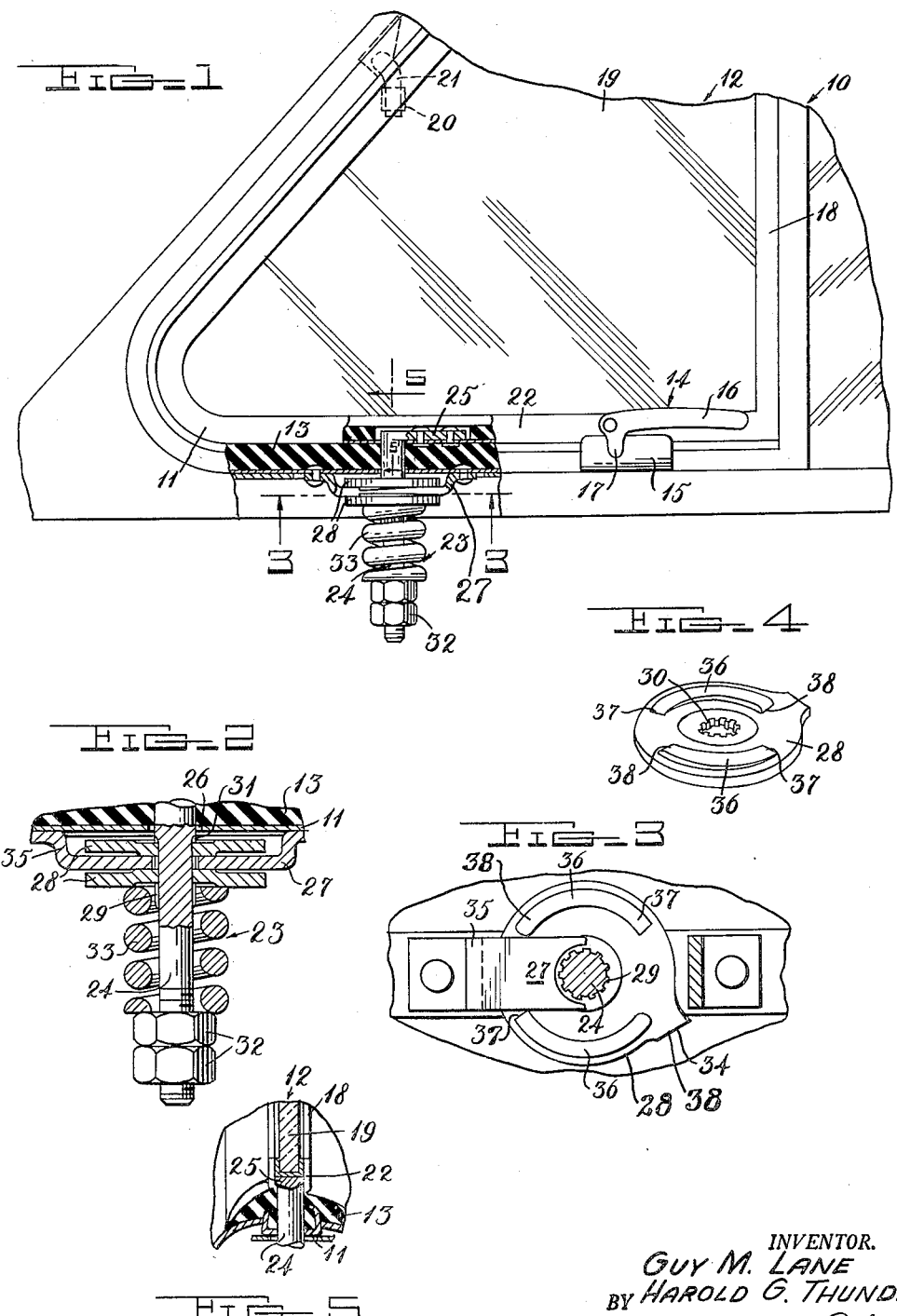

2,534,779

UNITED STATES PATENT OFFICE 2,534,779

VARIABLE FRICTION PIVOT FOR VENTILATOR PANELS

Guy M. Lane and Harold G. Thunder, Detroit, Mich., assignors to Motor Products Corporation, Detroit, Mich., a corporation of New York Application July 7, 1947, Serial No. 759,448

5 Claims. (Cl. 296—44)

This invention relates generally to ventilating systems for vehicle bodies of the type embodying a ventilator window having a pivotal panel adapted to be swung about a substantially vertical or up and down axis.

In certain types of ventilators installed in the window openings of vehicle bodies, it is customary to provide a friction pivot for holding the ventilator in any one of its various open positions. Although this particular construction is highly advantageous from the standpoint of low cost in manufacture, nevertheless, the provision of sufficient spring tension to effectively hold the ventilator in its open positions and at the same time permit easy operation of the ventilator presents a difficult problem in the design of such ventilators. This problem is greatly aggravated in the manufacture of large ventilators having a portion of substantial area adapted to be projected into the air stream in the fully open position of the ventilator. The force applied by the air stream tending to close the ventilator is considerable especially in the fully open position thereof, and the tension available at the friction pivot must be sufficient to overcome this force.

One of the objects of this invention is to provide a friction pivot assembly embodying sufficient spring force to effectively hold the ventilator in its fully open position, and at the same time, enabling relatively easy swinging movement of the ventilator to intermediate positions.

A more detailed object of this invention is to provide a friction pivot assembly embodying means for progressively increasing the spring force as the ventilator approaches its fully open position so that when in the latter position, ample friction is provided to hold the ventilator against return movement. Thus, the effort required to swing the ventilator to normal intermediate positions is less than the maximum available spring force.

The foregoing as well as other objects will be made more apparent as this description proceeds, especially when considered in conection with the accompanying drawings, wherein:

Figure 1 is a fragmentary elevational view partly in section of a ventilator window embodying the features of this invention;

Figure 2 is a fragmentary sectional view through the friction type pivot provided for the ventilator panel;

Figure 3 is a cross sectional view taken substantially on the line 3—3 of Figure 1 and having certain parts broken away for the sake of clearness;

Figure 4 is a perspective view of a part of the friction pivot assembly; and

Figure 5 is a sectional view taken on the line 5—5 of Figure 1.

In Figure 1 of the drawing there is illustrated a part of a vehicle body ventilator window 10 comprising a main frame 11 and a ventilator 12 supported in the main frame for swinging movement about a generally vertically extending axis. The main frame 11 is substantially channel-shaped in cross section and extends around the ventilator 12. The usual rubber weather sealing strip 13 is secured in the channel of the main frame 11 and cooperates with the ventilator panel in the closed position of the latter to form a weather-tight seal around the same. In accordance with conventional practice, the ventilator 12 is held in its closed position by a latch 14 having a keeper 15 suitably secured to the inner side of the main frame 11 adjacent the rear swinging edge of the ventilator and having an operating handle 16 suitably pivoted to the inner side of the ventilator 12 adjacent the keeper 15. This general type of latch has been used extensively in the past for the purpose of holding the ventilator in its closed position and need not be described in detail. It will suffice to point out that the operating handle 16 is provided with a dog 17 at its pivoted end for engagement with the inner side of the keeper 15 when the handle is swung to its lowermost position shown in Figure 1 of the drawing. The location and size of the dog is such that when the operating handle 16 is swung upwardly, the dog is released from the keeper 15 permitting the ventilator 12 to be swung to its open position.

The ventilator 12 comprises a frame 18 channel-shaped in cross section for receiving the marginal edges of a glass panel 19. In accordance with conventional practice a journal or bushing 20 is secured to the outer side of the front bar of the ventilator frame 18 adjacent the top of the latter for receiving a pivot pin 21 suitably mounted on the main frame 11. The bottom bar 22 of the ventilator frame 18 is pivoted intermediate the ends thereof on the main frame 11 by a friction type pivot assembly 23 having its axis of pivotal movement aligned with the pivot pin 21 to enable swinging the ventilator 12 relative to the main frame 11.

In the present instance the ventilator 12 is held in any desired open postiion by the action of the friction type pivot assembly 23. In detail this assembly comprises a pivot pin 24 adapted to extend downwardly through an opening formed in the base of the bottom section 22 of the ventilator frame 18, and is formed with a laterally extending tongue 25 at the upper end. The tongue 25 is seated in the channel of the ventilator frame section 22, and is riveted or otherwise permanently secured to the base of this channel. The pivot pin 24 extends into the channel of the adjacent portion of the main frame 11 and projects downwardly through an opening 26 formed in the base of the channel. A bracket 27 is secured to the bottom bar of the main frame 11, and is centrally apertured to enable the pin 24 to pass freely therethrough.

A pair of plates or discs 28 are respectively mounted on the pin 24 at opposite sides of the bracket 27. As shown particularly in Figures 2 to 4 inclusive of the drawing, the pin 24 is formed with a plurality of splines 29 and the disc 28 is formed with teeth 30 adapted to mesh with the splines 29. The arrangement is such as to compel rotation of the disc 28 as a unit with the pin 24 in response to swinging movement of the ventilator 12, and at the same time, permit relative sliding movement of the disc axially of the pin 24. The extent of upward sliding movement of the top disc relative to the pin 24 is limited by the shoulders 31 formed by the upper ends of the splines 29.

The extreme lower end of the pin 24 is threaded, and a pair of nuts 32 are threadably mounted on the pin. These nuts form an adjustable abutment for the lower end of a coil spring 33 having the upper end abutting the bottom disc 28. After the coil spring 33 is assembled on the pin 24, the nuts 32 are adjusted to place the coil spring under compression. Thus the discs 28 are yieldably clamped against opposite sides of the bracket 27 to frictionally hold the ventilator 12 in any desired open position. In this connection it will be noted that the top disc 28 is formed with a projection 34 adapted to cooperate with the front end 35 of the bracket 27 to limit the extent of outward swinging movement of the ventilator 12.

When ventilators of the above general type are swung to their fully open positions, a considerable area of the ventilator assumes a position in the air stream and extends transversely of the air stream. Thus considerable force is applied to the ventilator panel tending to swing the ventilator to its closed position. This force must be resisted by the action of the compression spring 33 embodied in the friction type pivot 23. However, the force exerted by the air stream tending to close the ventilator decreases as the angle of opening movement of the ventilator decreases, and advantage is taken of this fact herein to reduce the effort necessary to swing the ventilator to intermediate or partially open positions. In general this is accomplished by providing means for progressively increasing the spring pressure applied to the discs in response to swinging movement of the ventilator to its open position.

In detail a pair of cam surfaces 36 is formed on the inner surface of each disc 28 in concentric relation to the axis of rotation of the discs, and are arranged to respectively assume positions at the inboard and outboard sides of the bracket 27 when the ventilator panel 12 is in its closed position, shown in Figure 3 of the drawing. The cams 36 are tapered from their leading ends 37 to their trailing ends 38, so that upon swinging movement of the ventilator 12 toward its open position, the leading ends of the cams on the respective discs 28 engage opposite sides of the bracket 27 and tend to spread the discs apart. Since the top disc 28 engages the stops 31, it follows that the bottom disc 28 is displaced downwardly relative to the pin 24 and the spring 33 is compressed to a greater extent depending upon the amount of axial movement of the bottom disc 28. Owing to the tapered contour of the cams 36, it follows that the extent of downward displacement of the bottom disc 28 depends on the distance the ventilator 12 is swung outwardly. Thus the frictional resistance opposing closing movement of the ventilator is gradually increased as the ventilator is swung to its fully opened position. When the ventilator is swung to its fully opened position, the spring is compressed to its maximum extent so as to effectively hold the ventilator in its open position against the force of the air stream. However, when the ventilator is in a partially open or intermediate position, the spring is compressed to a lesser extent by the cams, and correspondingly less effort is required to manipulate the ventilator in this particular range.

What we claim as our invention is:

1. A window assembly comprising a main frame, a ventilator panel positioned in the main frame, means supporting the panel on the main frame for swinging movement about an up and down axis, said means including a pivot assembly having a part fixed against rotation with the ventilator panel, a pair of plates rotatable as a unit with the ventilator panel and positioned to frictionally engage opposite sides of the fixed part, means for yieldably holding the plates in frictional contact with the fixed part, and raised cam surfaces on adjacent sides of the plates in positions to engage opposite sides of said part upon rotation of the ventilator panel from its closed position and inclined to progressively increase the clamping pressure between the plates and fixed part in response to continued swinging movement of the ventilator panel toward its open position.

2. A window assembly comprising a main frame, a ventilator panel positioned in the main frame, means supporting the panel on the main frame for swinging movement about an up and down axis, said means including a pivot assembly having a fixed part on the main frame, a pair of discs rotatable as a unit with the ventilator frame and positioned at opposite sides of the fixed part, spring means for yieldably urging the discs in frictional contact with opposite sides of the fixed part, a pair of cam surfaces projecting from the inner surface of each disc and arranged to assume positions at opposite edges of the fixed part in the closed position of the ventilator frame, said cam surfaces being gradually tapered from the leading ends thereof to progressively increase the clamping pressure between the discs and fixed part in response to rotation of the ventilator toward its open position.

3. A window assembly comprising a main frame, a ventilator panel positioned in the main frame, means supporting the panel on the main frame for swinging movement about an up and down axis, said means including a pivot assembly having a fixed part on the main frame, a pair of discs rotatable as a unit with the ventilator frame and positioned at opposite sides of the fixed part, a coil spring held under compression for yieldably urging the discs in frictional contact with opposite sides of the fixed part, a pair of cam surfaces projecting from the inner surface of each disc in concentric relation to the axis of rotation of the discs by the ventilator panel and arranged to assume positions at opposite edges of the fixed part in the closed position of the ventilator panel, said cam surfaces being gradually tapered from the leading ends to the trailing ends thereof to progressively increase the extent of compression of the coil spring in response to swinging movement of the ventilator frame to its open position.

4. A window assembly comprising a main frame, a ventilator panel supported in the main frame, means pivotally connecting the ventilator panel to the main frame for swinging movement about an up and down axis, said means including a pivot assembly having a part fixed against rotation with the ventilator panel, a pair of plates rotatable as a unit with the ventilator panel and positioned at opposite sides of the fixed part in frictional contact therewith, spring means for holding the plates in frictional contact with the fixed part, and cam means on said plates arranged to assume positions at opposite sides of the fixed part in the closed position of the ventilator panel with respect to the main frame and having tapered surfaces engageable with the fixed part upon movement of the ventilator toward its open position to progressively increase the gripping action of the plates on the fixed part as the ventilator panel is swung to its fully open position.

5. A window assembly comprising a main frame, a ventilator panel positioned within the main frame, means supporting the panel on the main frame for swinging movement about an up and down axis, said means including a pivot assembly having a part fixed against rotation with the ventilator panel, a second part rotatable as a unit with the ventilator panel and engageable with the first part at one side thereof, spring means yieldably urging said parts into frictional engagement, and a raised cam surface on one of the parts in a position to engage the adjacent side of the other part upon rotation of the ventilator panel from its closed position toward its open position and inclined in a direction to progressively increase the clamping pressure between said parts as rotation of the ventilator panel toward its open position continues.

GUY M. LANE.
HAROLD G. THUNDER.

REFERENCES CITED

The following references are of record in the file of this patent:

UNITED STATES PATENTS

| Number | Name | Date |
|---|---|---|
| 2,022,423 | Knapp | Nov. 26, 1935 |
| 2,260,403 | Preston | Oct. 28, 1941 |